Sept. 4, 1956 W. E. HARBAUGH 2,761,197
METHOD OF MAKING A NON-DEFORMING LAMINATED ELECTRODE SUPPORT
Original Filed May 26, 1949 2 Sheets-Sheet 1
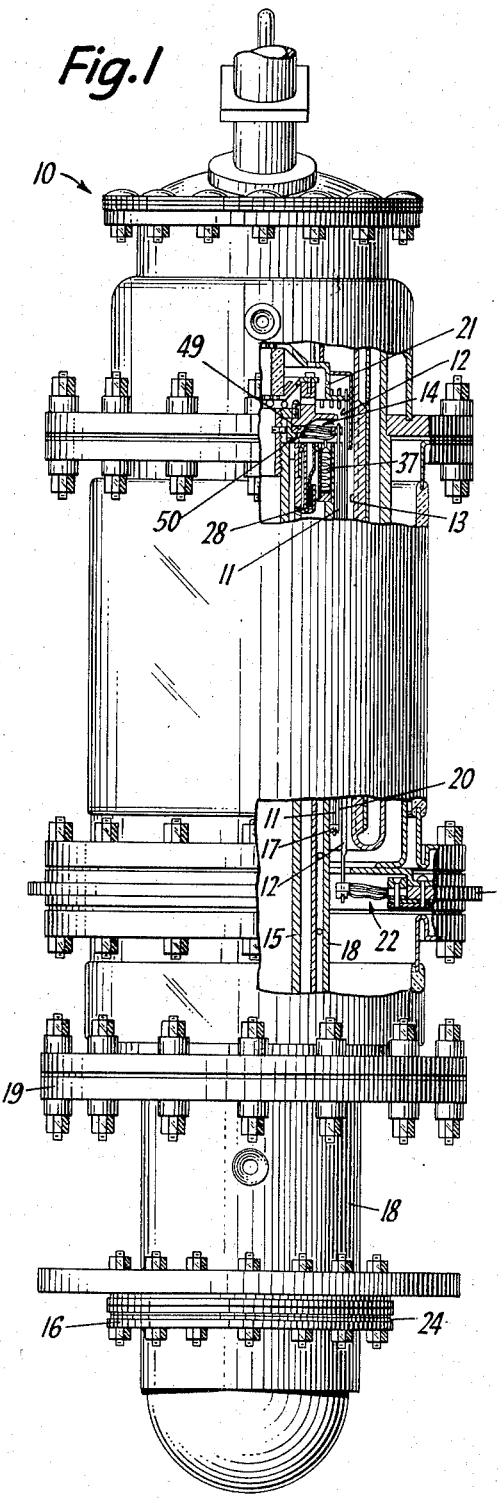
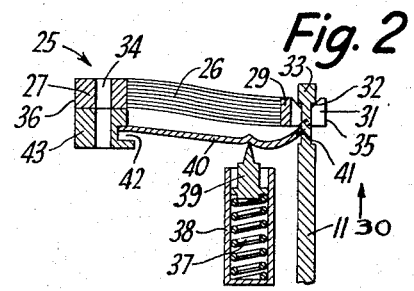
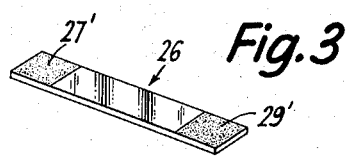
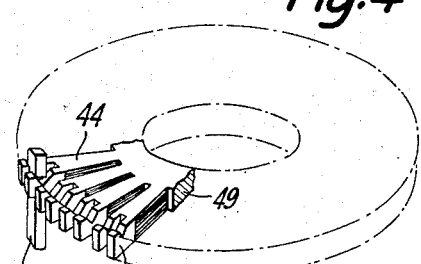
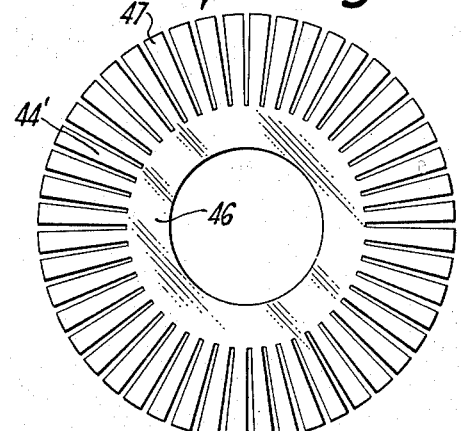
INVENTOR
WILLIS E. HARBAUGH
BY
William A. Zalesak
ATTORNEY Sept. 4, 1956    W. E. HARBAUGH    2,761,197
METHOD OF MAKING A NON-DEFORMING LAMINATED ELECTRODE SUPPORT
Original Filed May 26, 1949    2 Sheets-Sheet 2

INVENTOR
WILLIS E. HARBAUGH
BY
William A. Zalesak
ATTORNEY

United States Patent Office 2,761,197
Patented Sept. 4, 1956

2,761,197

METHOD OF MAKING A NON-DEFORMING LAMINATED ELECTRODE SUPPORT

Willis E. Harbaugh, Bareville, Pa., assignor to Radio Corporation of America, a corporation of Delaware Original application May 26, 1949, Serial No. 95,442. Divided and this application January 30, 1951, Serial No. 208,640

5 Claims. (Cl. 29—155.5)

The present invention relates to electrode assemblies and more particularly to such structures which effectively eliminate objectionable deformation or movement of the electrodes as well as an electron discharge device embodying the same.

The present application is a division of my co-pending application, Serial No. 95,442, filed May 26, 1949, now Patent No. 2,570,121, and assigned to the assignee hereof, and, as such, it relates in particular to methods of making articles originally described therein and again herein.

It is common knowledge that a limitation on electrode structures as well as devices embodying the same is deformation of the electrode structure during processing or operation of the same. In the main such deformation results from thermal expansion of the electrode and mount and constructions utilized heretofore have only been partially successful in overcoming this with the result that devices having electrode structure therein, in particular electron discharge devices, have been seriously limited in merit. The problem presented by such deformation is aggravated as the size of the affected parts is increased, however, even in the smallest of tubes it must be effectively dealt with if the maximum merit is to be obtained.

In the co-pending application of Lloyd P. Garner, Serial Number 95,398, filed May 26, 1949, now Patent No. 2,546,184, assigned to the assignee of the present application, there is shown a novel electrode support which eliminates the disadvantages of conventional electrode structures and has as one of its principal advantages the feature of flexibly mounting electrode elements in such manner that each element is free to elongate without any forces being transmitted to other elements or itself undergoing deformation, since no bending force is applied to the element as its support flexes. Garner's construction involves the use of two arms rigidly connected together by means of relatively thick blocks at their end portions and unconnected intermediate said portions. When one of the blocks moves as on elongation of the supported electrode, the edge of the block parallel to the axis of elongation remains parallel thereto when the unconnected portions of the arms flex much as though these elements form a pantographic system.

I have found that the flexibility as well as the thermal and electrical conductivity of such supports may be greatly improved at the same time permitting a much more compact and relatively small construction.

It is therefore a principal object of my present invention to provide an electrode support embodying high thermal and electrical conductivity with improved flexibility in an extremely compact structure.

Another object is the provision of a laminated electrode support having high flexibility, thermal and electrical conductivity which effectively restrains movement of the electrode in all directions other than a preselected one during processing and operation.

A further object of the invention is the provision of a flexible electrode support which maintains the electrode in axial tension and is capable of conducting large heating currents.

A still further object is the provision of a highly flexible electrode support which is also resilient and maintains the supported electrode in tension.

Yet another object is the provision of a highly flexible and resilient electrode support which constitutes a low impedance lead for high frequency currents.

Another object is the provision of an electron discharge device wherein an electrode element is maintained accurately positioned by means of a flexible support member capable of high electrical and thermal conductivities.

In carrying my invention into effect, I utilize a support made up of a plurality of thin flexible metal strips or laminations positioned with their surfaces in contact. A distinct area of each end of the strips are bonded together to form substantially solid blocks. The region between these blocks or bonded areas are left unconnected and free to flex. One end block is connected to and supports the electrode while the other end block is utilized for mounting the support.

The novel features that are considered characteristic of this invention are set forth with particularity in the appended claims. The invention as well as additional objects and advantages thereof will be best understood from the following description when read in connection with the accompanying drawings, in which Figure 1 is an elevational view partly in section of an electron discharge device embodying my present invention;

Figure 2 is a sectional view on an enlarged scale of a laminated flexible electrode support constructed in accordance with my invention;

Figure 3 is a perspective view also on an enlarged scale of one of the partially plated laminations prior to being joined with others in stacked array;

Figure 4 is a perspective view of the annular flexible laminated support embodied in the device of Figure 1;

Figure 5 is a plan view of a partially formed annular lamination utilized in constructing the annular flexible laminated support;

Figure 6:
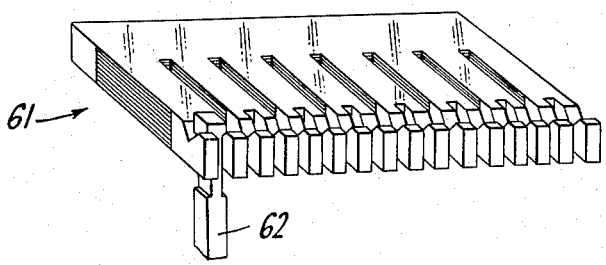
Figure 6 is a perspective view on an enlarged scale of a laminated support suitable for a planar array of electrode elements.

For the purpose of illustration, my invention will be described in connection with a triode type electron discharge device, however, it should be understood that it is not limited to the particular device shown, a high power tube capable of a power output of the order of 500,000 watts and forms the subject matter of my co-pending joint application with Lloyd P. Garner and William N. Parker, filed March 17, 1949, Serial Number 81,932, now Patent No. 2,544,664, which is assigned to the same assignee as my present application. As will be readily apparent, certain features of my invention are applicable to the mounting of electrodes where a certain degree of freedom of movement is necessary and desirable while all other movements must be restrained.

Referring now to the drawings, wherein corresponding parts have been designated by identical numbers, and to Figure 1 in particular, electron discharge device 10 is an internally water cooled triode having a cathode and grid, each of which comprises a circular array of discrete elements or bar-like sections indicated respectively at 11 and 12, surrounded by a cylindric anode 13 and all are housed in a demountable evacuated envelope as shown.

Each of the cathode elements or sections 11 is supported adjacent its upper ends by a laminated flexible support means indicated generally at 14 supported from central conducting tubular support member 15 which is supported on a copper diaphragm 24 by means of which it is connected electrically to terminal ring 16.

Still with reference to Figure 1, it is seen that the other or lower end of each cathode element or section 11 is inflexibly mounted in ring 17 brazed to outer cathode conducting support 18 at the lower end of a beam former array. Conducting support member 18 is coaxial and concentric with conducting support 15 and has a lower portion of increased diameter which, below terminal ring 19, forms part of the exterior envelope of the tube. The upper portion of conducting support 18 which is in the upper portion of the device 10 has a plurality of grooves machined therein, one for each of the cathode sections of which there are forty-eight in the tube illustrated. Said grooves are separated by lands 20 which function as the beam former array and focus the electron stream emitted from each cathode section. It is apparent, therefore, that each cathode section is flexibly mounted at one end to one conducting support member and inflexibly mounted at the other end to the other conducting support member. Further it should be noted that the conducting supports 15, 18 are rigidly connected by a mechanically strong insulating and hermetic seal 28.

Insulated from and supported on central conductor 15 is a hat shaped grid support member 21 having a peripheral flange at its lower extremity with slots and centering or locating V notches formed therein. There is one slot for each grid element 12 which are equal in number to cathode elements 11. Grid elements 12 hook into grid support member 21 and are accurately positioned by means of the slots and V notches, as will be more fully described hereinbelow, in such manner that each grid element is opposed to one of the lands 20 intermediate two adjacent cathode elements. Adjacent their lower ends, each grid element or section 12 is hooked or clipped into resilient and flexible laminated support means 22 which in turn are supported from grid terminal ring 23.

The cathode, grid and beam former arrays form closely positioned, critically spaced units with the cylindric anode. In the tube illustrated the cathode and grid elements are bars approximately 8 inches in length. It is obvious that such a construction would be subject to objectionable deformation during processing and operation which would render it inoperative were the cathode and grid elements not mounted in such manner that they may freely elongate and contract without undergoing deformation. One of the important instrumentalities employed in tube 10 and described herein is the hooked or clipped-in quick detachable connection between the electrode elements and their support means which in addition to eliminating at least one of the causes of deformation also makes possible pre-processing and ready replacement of the electrode elements. This feature of hooking or clipping-in the electrodes in interlocked fashion with the support means does not form part of my invention but is disclosed and claimed in Garner's co-pending application referred to hereinabove.

Referring now to Figures 2 and 3, in detail, there is seen the essential features of one manner of constructing a laminated support means wherein auxiliary elements supply the force necessary to maintain the electrode, which in the present illustrative example is cathode element 11, in axial tension. Laminated supporting means 25 is made of a multiplicity of laminations 26 which are joined or bonded adjacent each of their ends to form substantially solid blocks 27 and 29, while laminations 26 in the region intermediate blocks 27, 29 are not joined but left free and unconnected one to the other. Leaving the laminations unbonded intermediate their end portions provides a high degree of flexibility in direction 30, the direction of thermal expansion of the electrode 11. Laminations 26 are formed from highly conducting material such as copper or chromium copper alloy rolled down to a thin cross sectional thickness. In the construction illustrated I have found that a thickness of approximately .002 inch proved highly satisfactory. Such thin laminations have exceedingly small cantilever and beam action forces when deflected and may be joined at their end portions 26, 29 by solid diffusion. I preferably effect the solid diffusion by electroplating or otherwise depositing on both sides of alternate laminations a second metal such as gold at 27' and 29'. The laminations are then stacked with unplated laminations intermediate plated ones so that every boundary in the areas 26' and 29' present a gold-copper interface. The stacked laminations can then be heated to an elevated temperature in a non-oxidizing atmosphere while pressure is applied to regions 27', 29' causing a solid diffusion to occur producing a strong permanent bonding of the laminations in the form of blocks 27, 29. Blocks, or solid regions 27, 29 are then used for mountings for the electrode and the electrode support assembly. Block 29 may be machined or otherwise slotted to form slot 31 and V groove 32 for supporting and locating head 33 of electrode 11. Block 27 may be drilled or tapped as indicated at 34 or otherwise machined so that the structure may be mounted as desired.

In carrying out the bonding of the laminations to form blocks 27, 29 under heat and pressure, I have found that in some instances the loose contact between the intermediate portions of the laminations has been sufficient to cause some mutual diffusion and consequent sticking of the laminations. To avoid the possibility of this occurring, I provide between these portions of the laminations a coating forming an insulating barrier or electro-deposit some oxidizable material such as chromium. If chromium bearing copper is used to form the laminations, such additional materials are not required. I then carry out the solid diffusion in a reducing atmosphere containing water vapor. Apparently under such conditions selective oxidation of surface chromium by the water vapor takes place and this oxidized layer of chromium acts as an intermediate insulating barrier and prevents sticking of the laminations in the unbonded region.

As most clearly shown in Figure 2, where the thickness of the individual laminations has been greatly exaggerated for the purpose of illustrating the same, the laminations all assume identical shapes and remain parallel when deflected in a direction parallel to the electrode. Thus, as support 25 flexes face 35 of block 29 remains at all times parallel to face 36 on block 27. This permits the electrode to move or elongate parallel to direction 30 without bending forces being introduced by the mounting structure. In addition the beam action and columnar strength of the stacked laminations provides high resistance to motion of the electrode except axially. Each lamination contributes to the thermal and electrical conducting properties of the element so that the thermal and electrical path is the total cross section of the stacked laminations. By virtue of the extreme flexibility of the system a considerable stack of laminations can be used as well as a relatively short overall length. Such a stack has relatively low thermal and electrical resistance and the laminated support and electrode junction remain cool in operation.

Referring once again to Figure 2, electrode 11 is maintained in axial tension and in electrical contact with block 29 by means of coil spring 37 in cylinder 38 acting through link 39 against rocker arm 40. The power end of rocker arm 40 is bifurcated as at 41 and bears against block 29 in a V groove in line with the axis of the electrode and directly under head 33. The other end of arm 40 is free to rotate in notch 42 formed in support member 43. On referring to Figure 1 it is seen that just such a construction is utilized to axially tension each electrode element 11. As most clearly seen in Figure 4, laminated support 14 is annular in shape with a central aperture. It is similar in construction to laminated support 25 except that it is adapted to independently flexibly support each of a plurality of electrode elements, one being hooked into each of its flexible segments 44. Such a support 14 is made from sixty laminations 45 which also are approximately .002 inch thick and may readily be stamped or blanked from sheet material. As described above in connection with laminations 26, alternate laminations 45 are gold plated on both sides of central portion 46, peripheral portions 47 of segments 44' formed by the slots as shown. The desired number of laminations are stacked in proper registration and bonded by solid diffusion as described hereinabove; peripheral portions 47 forming blocks 48 .108 inches wide in the radial direction and central portions 46 forming common mounting base 49 with unbonded flexible segments 44 .6 inches long therebetween. Mounting base 49 is clamped in position on flange 50 (Fig. 1) of an L shaped ring which in turn is clamped on conducting support 15 and is in good electrical contact therewith. Flange 50 has a peripheral groove formed therein similar to notch 42 to receive one end of rocker arms 40, the bifurcated ends of which bear against a V notch on the under side of each block 48. A plurality of cylinders 38, with springs 37 and links 39 one for each rocker arm are arranged in circular array on a shoulder adjacent the upper end of conducting support 18 in an annular channel formed by seal 28 and support 18. In view of the difference in electrical potential between rocker arm 40 and coil spring 37, link 39 is made from insulating material such as ceramic. It is apparent that each electrode element 11 in tube 10 is free to elongate without influencing any of the other electrode elements in the array and without deformation.

In view of the high temperature to which all tube elements are heated to remove internal and surface gases, it is necessary that coil spring 37 be made of such material which retains its resiliency at such temperatures. A highly suitable material for high temperature springs is one of the ferrous tool steel alloys which are known as red hard. One such material is an alloy containing 18% tungsten, 4% chromium, 1% vanadium, 0.7% carbon and the remainder substantially all iron. Although normally used as a hard cutting tool steel this material in an annealed condition may be drawn into the form of a wire which may then be used to make coil springs 37. In heat treating this alloy I quench the same from a high temperature 1320° C. in a neutral atmosphere followed by two drawing or tempering heatings at 600° C. which produce maximum strain free hardness.

Figure 7:
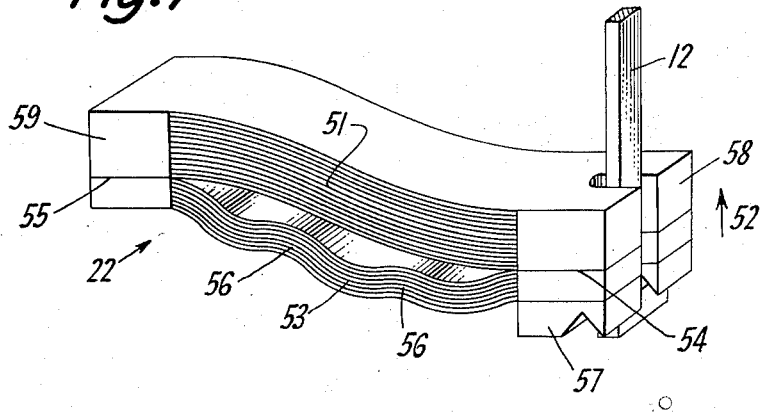
Figure 7 is a perspective view on a greatly enlarged scale of the flexible and resilient laminated support embodied in the device of Figure 1.

I also form my laminated support means in such manner that auxiliary tensioning means such as coil springs 37 are not required; the tensioning of the electrode being effected by the laminated support itself which is in such case resilient. Resilient and flexible laminated support means 22 (Fig. 1) referred to hereinabove is such a support and is shown greatly enlarged for convenience in Figure 7. In such a support laminations 51 are made of a hard resilient material such that when the support is deflected and the deflecting force is then released the support will invariably return to its original shape Support 22 is so constructed that the laminations are off-set from the centerline in a predetermined manner as shown in Figure 7. When assembled the electrode element 12 deflects the pantographic support in the direction 52. The resiliency of the support then at all times maintains a tension force on electrode element 12 by reacting in the opposite direction provided that the predetermined offset is made greater than the thermal expansion of the electrode member at elevated temperatures.

The lamination spring material may be an alloy of the 18% tungsten, 4% chromium, 1% vanadium, .7% carbon, balance iron type rolled very thin, for instance .005". Such a material, which is commonly known as high speed steel, will retain its hardness and resiliency at temperatures above those normally found in electron tube operation. A disadvantage of this material and most other spring materials is an inherent low thermal and electrical conductivity as compared to copper. This low conductivity may be compensated by providing an additional thermal and electrical path. As shown in Fig. 7, laminations 53 are of material such as copper approximately .002 inch thick having high thermal and electrical conductivity. These laminations are bonded or joined with the steel laminations at 54 and 55 in the manner shown. This thermal and electrical conductor is made of a plurality of thin laminations so that it will be highly flexible and exert very little restraining forces on the action of the spring steel support. Also these copper laminations are provided with waves 56 so that the copper does not affect the thermal expansion of the system which remains that of the steel alone.

An additional block of copper or like material is provided at 57 so that machining operations can be accomplished for a V groove clip-in type of mounting without impairing the thermal and electrical conductivity of the flexible conductor in the bonded region.

Figure 8:
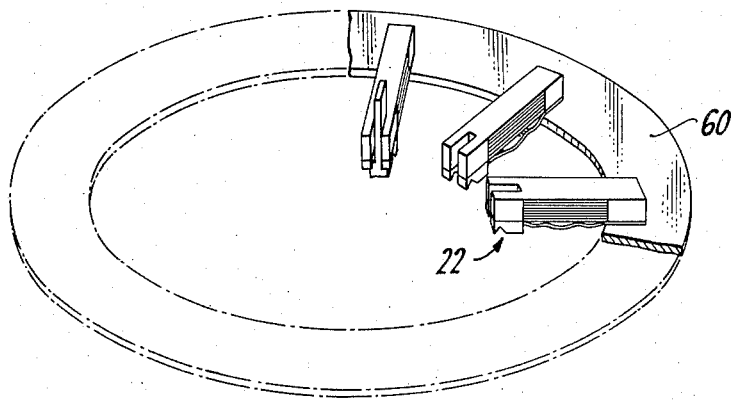
Figure 8 is a fragmentary perspective view also on an enlarged scale of a circular array of the supports of Figure 7.

Bonding the spring steel laminations together in the regions 58 and 59 may be accomplished by solid diffusion techniques. In solid diffusion bonding a coating such as copper is applied firmly to the steel and a third mutually soluble material such as gold can be deposited on the regions to be bonded. In applying the base coating of copper to the steel it is electroplated or otherwise deposited and heated at an elevated temperature to cause good adhesion to the steel. The copper coating may be applied before the material is rolled to its final thickness in which case the copper greatly facilitates the rolling of this hard matereial and successive rolling and annealing causes a good bond to be formed between the copper and steel. This copper clad steel can then be hardened sufficient for spring service by quenching from a temperature below the melting point of copper. After hardening, gold is deposited in the region where bonding is desired either on one side of each lamination, or on both sides of alternate laminations so that at each bonded junction a gold face is presented to a copper face. By clamping the stacked laminations under pressure and raising the temperature to approximately 600° C. solid diffusion takes place between the gold and copper causing bonding of the copper clad steel laminations in the desired regions. In addition heating the steel laminations to 600° C. at this time acts as a first drawing or tempering operation which causes an effect which is well known in steel hardening practice as "secondary hardening" in which austenite remaining from the quench from high heat is converted to martensite. It is during this operation that the offsetting of the horizontal planes of the end blocks, such as shown in Fig. 7, may be accomplished. A second draw or temper at 600° C. which follows the above treatment serves only to relieve hardening strains from the first drawing operation. This second drawing operation may also be the means for solid diffusing the complete pantograph to a mounting ring or block 60 (Fig. 8). In bonding the laminations by solid diffusion a suitable jig is provided which holds the steel and copper laminations and blocks in the proper position, provides the proper offset if this is desired, and provides a high pressure in the bonding areas. This pressure can be obtained by providing a suitable clamping means on the jig such as steel bolts, preferably of a red hard material, which react against a material having a higher thermal expansion such as an austenitic stainless steel having 18% chromium, 8% nickel, balance iron. The high expansion stainless steel exerts considerable force against the restraining steel bolts when the temperature is raised to 600° C. or that necessary to cause solid diffusion of the lamination interfaces. This force may be applied to the stacked laminations in the area where bonding is desired to insure good contact between the laminations which further enhances the diffusion operation.

An electrode support constructed in a manner described above and shown in Fig. 7 opperates in the same pantographic manner as that shown in Fig. 2 since at all times the shapes of the laminations and their lengths are substantially constant. In addition a tension force is maintained on electrode 12 by the integral spring of the steel laminations. The structure of the electrode support resists motion at right angles to the axis of the electrode.

As shown in Fig. 6, my invention is also applicable to other than circular arrays of electrodes. Laminated flexible support 61 is adapted to mount a plurality of electrode elements 62 in planar array; the lower ends of the electrodes being clipped into a mounting block not shown.

It is apparent from the foregoing that I have provided an electron discharge device having a flexible laminated means for mounting electrodes in such manner as to avoid deformations thereof, capable of efficient operation at elevated temperatures and of withstanding innumerable flexings yet which is simple to construct, is extremely compact, and simplifies the assembly of electrode elements. I believe that my invention may be subject to obvious modifications by those skilled in the art, however, it is intended to cover all such modifications as come within the scope of the appended claims.

What I claim is:

1. The method of making a laminated flexible substantially non-derformable support member having solid end portions in which the end surfaces of said end portions are maintained parallel when one of said end portions is deflected with respect to the other, comprising arranging a plurality of readily deformable metallic laminations in stacked array with bonding material diffusible in said laminations intermediate opposed surfaces of said stacked laminations, heating said stacked lamination to a temperature below the melting points of said laminations and said bonding material and an alloy therebetween, and applying pressure at said temperature only to said end portions to bond only said end portions by solid diffusion of said bonding material and form solid blocks therefrom while maintaining elongated portions of said laminations intermediate said end portions thereof unbonded and free to flex and slide with respect to one another, whereby said bonded end portions may be readily deflected with respect to one another by forces applied in a direction normal to the opposed surfaces of said laminations but effectively resist forces applied thereto in other directions.

2. The method of making a laminated flexible substantially non-deformable support member having solid end portions in which the end surfaces of said end portions are maintained parallel when one of said end portions is deflected with respect to the other, comprising arranging a plurality of readily deformable copper clad high speed steel laminations in stacked array with bonding material diffusible in said laminations intermediate only the end portions of opposed surfaces of said stacked laminations, heating said stacked laminations to a temperature below the melting points of said laminations and said bonding material and an alloy therebetween and applying pressure at said temperature only to said end portions to bond only said end portions by solid diffusion of said bonding material and form solid blocks therefrom while maintaining elongated portions of said laminations intermediate said end portions thereof unbonded and free to flex and thereby effecting a first tempering operation, and then reheating said laminations to complete the tempering thereof to provide a highly resilient support member, the bonded end portions of which may be deflected with respect to one another by forces applied in a direction normal to the opposed surfaces of the laminations but effectively withstand forces applied thereto in other directions.

3. The method described in claim 1 wherein at least the surface portions of each of said laminations are copper, said bonding material is gold and the temperature of said stacked laminations is raised to approximately 600° C.

4. The method described in claim 2 wherein said bonding material is gold and the temperature of said stacked laminations is raised to approximately 600° C.

5. The method of making a laminated flexible substantially non-deformable support member comprising the steps of applying a copper coating to a sheet of spring steel, rolling the copper coated spring steel to a desired thickness, stamping out laminations from said sheet of copper coated spring steel, said laminations having a desired elongated configuration, applying a bonding material diffusible in said copper coating to both sides of both ends of certain of said elongated laminations leaving a central area of said laminations free of said bonding material, arranging said laminations in stacked array with said certain of said laminations having a bonding material on their end portions alternated with said laminations not having bonding material applied to their end portions, heating said stacked laminations to a temperature below the melting points of said copper and said bonding material and an alloy therebetween and applying pressure at said temperature only to said end portions of said laminations to bond only said end portions by solid diffusion of said bonding material and form solid blocks therefrom while maintaining the central portions of said laminations unbonded and free to flex.

References Cited in the file of this patent

UNITED STATES PATENTS

| Number | Name | Date |
|---|---|---|
| 1,365,291 | Stevens | Jan. 11, 1921 |
| 1,433,213 | Lowell | Oct. 24, 1922 |
| 1,560,308 | Perry | Nov. 3, 1925 |
| 1,597,189 | Gero | Aug. 24, 1926 |
| 1,731,218 | Adams | Oct. 8, 1929 |
| 2,112,694 | Everett | Mar. 29, 1938 |
| 2,126,074 | Wissler | Aug. 9, 1938 |
| 2,233,455 | Larson | Mar. 4, 1941 |
| 2,276,847 | Kelley | Mar. 17, 1942 |
| 2,327,437 | Kronquest | Aug. 24, 1943 |
| 2,392,917 | Guinee | Jan. 15, 1946 |
| 2,426,467 | Nelson | Aug. 26, 1947 |
| 2,466,890 | Gilbertson | Apr. 12, 1949 |
| 2,479,325 | De Domenico | Aug. 16, 1949 |
| 2,512,351 | Lynn | June 20, 1950 |